United States Patent Office 3,128,228
Patented Apr. 7, 1964

3,128,228
TISSUE CULTURE MEDIUM
Jiří Michl, Prague, Czechoslovakia, assignor to Ustav ser a ockovacich latek, Prague, Czechoslovakia
No Drawing. Filed Feb. 27, 1961, Ser. No. 91,593
Claims priority, application Czechoslovakia Mar. 4, 1960
7 Claims. (Cl. 167—78)

The present invention relates to a tissue culture medium and to a method of preparing the same.

In the preparation of tissue cultures, as hitherto practised, blood serum is used as the last undefined component of the culture medium. The object of the present invention is the preparation of a culture medium containing standard components which provide controllable conditions for cell growth in tissue cultures and at the same time eliminate the use of blood serum, which contains some components inhibiting cell growth.

Such tissue cultures may be used for the preparation of inoculants against certain virus diseases, for dealing with problems encountered in immunology and regarding the effect of antibiotics and chemotherapeutics etc. and this is why nowadays tissue cultures are produced on the scale of factory production.

In the cultivation of tissue cultures the medium used is a compound mixture of nutritive salts, protein fission products, vitamins or coenzymes, sugars and blood serum. In the absence of serum only some types of cells may be cultivated and even then the results are less satisfactory. In general, a prolonged cultivation of cells without blood serum is not feasible (see J. Paul: Cell and Tissue Culture, E. & S. Livingstone Ltd., Edinburgh and London, 1959).

This is the reason why some research workers have tried to use protein fractions of sera as components of the tissue culture medium. In no instance, however, has it been possible to produce cultures comparable as to their quality to cultures grown in a serum-containing medium (see H. Eagle: Science 122, 501, 1955) nor has a prolonged, continuous cultivation of cells in a tissue culture been achieved (see I. Lieberman, P. Ove: J. Biol. Chem. 233, 637, 1958).

Just one single medium is known which enables the continuous cultivation of tissue cultures and does not contain any serum; said medium, however, contains fetuin, a protein of the serum of a bovine fetus, i.e., a rather inaccessible and expensive product (T. Puck et al.: J. Exptl. Med. 109, 649, 1959).

Certain types of cells can at present be cultivated in a medium without serum proteins; however, media of such types contain substances affecting metabolic processes (such as insulin, mucate, salmine sulphate, see R. E. Neumann and A. A. Tytell: Proc. Soc. Exptl. Biol. Med. 104, 252, 1960) or products released by an exhaustive dialysis from the serum and thus not defined in composition and function (D. P. Metzger, M. Moskowitz: Proc. Soc. Exptl. Biol. Med. 104, 363, 1960).

The use of the blood serum as a whole is disadvantageous with a view to the presence of gamma-globulins and lipoproteins with a relatively high content of lipids which tend to exert an inhibiting influence on the cells; some sera may even have a distinctly toxic effect upon the tissue culture. The use of fetuin offers difficulties in obtaining the fetal serum, apart from its high cost.

Considering that the majority of culture media consists of defined or at least standard substances, the use of a serum appears objectionable even in this respect. A serum is a complex mixture of high molecular and low molecular substances, containing not only matter which is indispensable for cell growth but also components, which, on the contrary, may have an inhibitory effect on the growth. It appears therefore preferable to use but such components which are essential for the growth of the cells. By isolating such substances it is possible to determine their properties and to devise a process for their preparation in standard form. The cells of tissue cultures require a part of the high molecular proportion, while the low molecular part, even if it has a stimulating effect, is not indispensable and may be replaced for instance by an enzymatic hydrolysate of certain proteins, such as lactalbumin hydrolysate.

It is an object of the present invention to dispose to a substantial degree of the aforementioned shortcomings by providing a culture medium for the preparation of tissue cultures, on the basis of serum protein fractions and a nutrient solution containing nutrient salts, protein fission products, in particular amino acids, further sugars and vitamins or coenzymes.

The primary feature of the invention lies therein that the culture medium contains as serum protein fractions a mixture of serum albumin and a specific alpha-globulin with an electrophoretic mobility of 4.55 to $4.75 \times 10^{-5} \times$ $cm.^2/v. \times sec.$ (in a veronal buffer of pH 8.6; $\mu=0.1$ at 4.25 v./cm.), in a total amount of 0.05–3.00 percent of weight, related to the weight of the total amount of the culture medium.

Alternatively, the tissue culture medium may contain a growth-active globulin, the electrophoric mobility of which is $4.55–4.75 \times 10^{-5} \times cm.^2/v. \times sec.$ (in a sodium veronal buffer of pH 8.6; $\mu=0.1$ at 4.25 v./cm.) or some of the high-molecular or low-molecular bound parts of said growth-active alpha-globulin.

In a further modification of the invention the serum albumin fraction can be replaced by another substance which adjusts the viscosity of the medium to 14–32 c.p.s., for instance methyl cellulose as required by the method of cell cultivation.

By employing the culture medium according to the invention it is possible to achieve a continuous cultivation of tissue culture cells at the same rate of cell growth as upon application of the whole serum, while the cells show a clear plasma and an improved morphological appearance in general.

According to the invention the significance of the individual protein fractions was determined by dividing the serum into a number of fractions by means of progressive saturation with solid ammonium sulphate. The capacity of promoting the growth of said fractions was tested on cultures of epithelial human carcinoma cells, known in literature under the name of HeLa cells, and monkey heart cells. The fractionation process is indicated in the following table No. 1.

TABLE 1

| Initial quantity of serum | Percent of saturation with ammonium sulphate | Fraction | Composition of fraction |
| --- | --- | --- | --- |
| 1.000 ml | 35 | I | gamma-globulin, beta-globulin. |
| | 40 | II | beta-globulin, alpha-globulin. |
| | 50 | III | alpha-globulin. |
| | 62 | IV | albumin. |

The individual fractions were dialyzed for 24 hours against running tap water at 20° C. and twice 12 hours against 10 litres of deionized water at 4° C. After the dialysis they were used for cultivation of tissue culture cells in a mixture with a synthetic medium supplemented by 0.2% lactalbumine hydrolysate. The contents of individual fractions in the medium amounted to 1%. The growth activity of the various fractions was expressed as the ratio of the number of cells which multiplied from the inoculum unit of 100,000 cells to mg. percent protein during a 72 hours' cultivation at 37° C. The number of cells was ascertained by counting in a Buerker counting chamber following their release from the glass surface by Versene and staining with gentian violet.

Table No. 2 shows a comparison of growth rates of tissue culture cells in media containing various fractions.

TABLE 2

| The culture medium contains— | Ratio of cells/mg. percent protein in the medium |
|---|---|
| Fraction I | 36 |
| Fraction II | 90 |
| Fraction III | 170 |
| Fraction IV | 0 |
| Serum | 180 |

As evident from the table a growth rate has been achieved, which is comparable as to quantity with the growth rate in a serum-containing medium when fraction III consisting of alpha-globulins is used.

In the course of a prolonged cultivation of tissue cultures in this medium a degeneration of cells sets in. If, however, serom albumin in a concentration of 0.1–0.5% is added to such cultures, the degeneration of cells can be obviated.

On these lines a culture medium has been prepared for tissue cultures, said medium containing nutrient salts, glucose, vitamins, amino acids, serum albumin, an alpha-globulin fraction and lactalbumin hydrolysate, which substances may easily be prepared. At present HeLa cell cultures have been cultivated in said medium for more than twelve months. It can be assumed, therefore, that such a medium enables a continuous cultivation of tissue culture cells, it being possible to obtain high quality tissue cultures in this way. A quantitative comparison of growth is indicated in Table No. 3.

TABLE 3

| The culture medium contains— | Time of growth, hours | Amount of cells generated from an inoculum of 100,000 cells |
|---|---|---|
| Fraction III with 0.4 albumin | 96 | 306,000 |
| Fraction III with 0.4 albumin and with 0.2% lactalbumin hydrolysate | 96 | 630,000 |
| Synthetic medium with 40% serum | 96 | 670,000 |

With a view to the fact that both albumin fractions of the serum which are essential for the promotion of cells in the tissue culture are precipitated when salted out with ammonium sulphate, a process has been developed enabling the simultaneous isolation of both fractions:

Blood (for example calf blood) is allowed to coagulate in glass cylinders at 4° C. for 48 hours. The serum is separated by centrifuging and to 10 litres of serum 2400 grams of recrystallised ammonium sulphate are added. The solution is allowed to stand at laboratory temperature (18–25° C.) until the ammonium sulphate is dissolved; after having been allowed to stand for 24 hours at 4° C. the precipitated proteins are filtered off through a paper filter. The precipitate is mixed with 4000 ml. of a solution produced by mixing 1520 ml. of saturated ammonium sulphate solution with 2480 ml. deionized water and adjusted by means of a concentrated ammonia to pH 7. After filtering off under the same conditions the extraction is repeated once more with half the volume of the solution.

The combined clear filtrates are mixed with solid ammonium sulphate in an amount of 220 g. ammonium sulphate to 1000 ml. filtrate. The mixture is allowed to stand at laboratory temperature until the ammonium sulphate is dissolved, and 24 hours at 4° C. The separated precipitate is filtered off through a paper filter. The precipitate represents the active fraction of the serum. The filtered off precipitate is dialyzed for 48 hours against running tap water and twice 24 hours against 10 litres of deionized water at 4° C. No sulphate ions must be present in the solution after dialysis. In order to clarify the solution it is filtered through a glass filter G3 or through a Seitz filter EKS and dried by lyophilisation. The substance thus produced has standard characteristics, is easily soluble in water and in physiologic solution and is stable. It contains albumin and specific alpha-globulin with an electrophoretic mobility of $4.68 \times 10^{-5}$ cm.$^2$/v.$\times$sec., in addition to impurities consisting of inactive alpha globulins, which have no inhibitory influence upon tissue culture cells.

In order to fit higher requirements the active alpha-globulin may be obtained in an electrophoretically homogenous state (about 97%) from a serum fraction which is precipitated by ammonium sulphate within a range of saturation with ammonium sulphate 40–45% and by dialyzing this fraction (in the form of 5% albumin solution) against 100 vol. of demineralized water twice for 24 hours. After dialysis the precipitated, not active, protein is removed by centrifuging and the pH of the supernatant is adjusted with the aid of 0.1–0.5 n HCl to 5.0. The precipitated sediment is reprecipitated five times by repeated dissolution at pH 7 (in an equal volume of demineralized water) by means of 0.1–0.5 n NaOH and by repeated precipitation at pH 5. The thus purified protein has an electrophoretic pattern $$4.55\text{--}4.75 \times 10^{-5} \times \text{cm.}^2/\text{v.} \times \text{sec.}$$

(in a veronal buffer pH 8.6; $\mu=0.1$ at 4.25 v./cm.). In a concentration of 0.025 percent by weight it is equally effective as the aforementioned fraction, provided the medium contains at the same time another macromolecular substance adjusting the viscosity of the medium to 16 cps. (for instance 0.375% serum albumin or about 0.01% methylcellulose), i.e., for stationary cultivation or to 14–32 cps. for submerged cultivation. The growth-active alpha-globulin is a complex of two proteins containing bound hexoses, hexosamines, sialic acid and lipids. By chromatographic fractionation (for instance on calcium phosphate) or by a long lasting dialysis in the presence of a small amount of proteolytic enzymes at 37° C. a low-molecular part can be released, said part being capable of substituting as to its function the entire alpha-globulin in the medium for tissue cultures.

In its final form the culture medium enabling a continuous cultivation of tissue culture cells comprises therefore:

(1) Nutrient salts (such as Hank's, Earle solution).
(2) Glucose (or other suitable sugar).
(3) Vitamins or coenzymes (for instance according to the described Parker, Eagle medium).
(4) Amino acids (for instance according to Parker, Eagle etc.).
(5) A mixture of albumin (or other macromolecular substance) and specific alpha globulin.
(6) Protein hydrolysate, the content of which is generally not indispensable.

In the absence of an enzymatic protein hydrolysate the growth rate is smaller (see Table 3).

The above described culture medium was prepared and tested also in connection with other types of tissue cultures, and when a total protein fraction amounting to 0.4% by weight, was used (which proved best suited for the purpose) it was found suitable for all tested tissue cultures; primary cultures of monkey, dog and rabbit kidneys and for strains of human HeLa cells, human liver cells—Chang's strain, mice L-cells, strains Detroit 6, Hep 2, KB, human amnium, for monkey heart cells (Salk strain) and it can therefore be assumed, that it is generally applicable.

In the following example some compositions of culture media will be quoted:

(1) *Medium for Primary Cultures of Monkey Kidney*

The following substances are dissolved in 500 ml. deionized water. After their dissolution the volume of the solution is supplemented to 1000 ml.:

| | | |
|---|---|---|
| l-arginine | mg | 17.4 |
| l-cystine | mg | 6.0 |
| l-histidine | mg | 3.2 |
| l-isoleucine | mg | 26.2 |
| l-leucine | mg | 13.1 |
| l-lysine | mg | 18.2 |
| l-methionine | mg | 7.5 |
| l-phenylalanine | mg | 8.3 |
| l-threonine | mg | 11.9 |
| l-tryptophane | mg | 2.0 |
| l-tyrosine | mg | 18.0 |
| l-valine | mg | 11.7 |
| l-glutamine | mg | 146.0 |
| Glycine | mg | 7.5 |
| Nicotinic acid | mg | 1.0 |
| Ca-pantothenate | mg | 1.0 |
| Pyridoxal | mg | 1.0 |
| Choline | mg | 1.0 |
| Riboflavin | mg | 0.1 |
| Thiamine | mg | 1.0 |
| i-Inositol | mg | 1.0 |
| Biotin | mg | 1.0 |
| Folic acid | mg | 1.0 |
| Glucose | g | 1.0 |
| NaCl | g | 8.0 |
| KCl | g | 0.4 |
| $CaCl_2$ | g | 0.14 |
| $MgSO_4 \cdot 7H_2O$ | g | 0.2 |
| $Na_2HPO_4 \cdot 2H_2O$ | g | 0.06 |
| $KH_2PO_4$ | g | 0.06 |
| Phenol red | g | 0.02 |
| Lactalbuminhydrolysate | g | 2.0 |
| Mixture of albumin and alpha globulin | g | 0.5 |

Remarks regarding the preparation:

A. l-cystine and l-tyrosine are preliminarily dissolved in 50 ml. deionized water containing 10 ml. 0.075 n HCl, by heating to 37° C. After dissolution this is mixed with the main solution (prior to supplementing to 1000 ml.!).

B. The solution is sterilized by filtration through a glass filter G5. Prior to use the pH value is adjusted to 7.2 with the aid of a sterile 7.5% solution of natrium bicarbonate and penicillin as well as streptomycin are added in a total final concentration of 100 I.U. penicillin and 100 gamma streptomycin to 1 ml. of the medium.

(2) *Medium for HeLa Cells*

| | | |
|---|---|---|
| l-arginine | mg | 17.4 |
| l-cystine | mg | 6.0 |
| l-histidine | mg | 3.2 |
| l-isoleucine | mg | 26.2 |
| l-leucine | mg | 13.1 |
| l-lysine | mg | 18.2 |
| l-methionine | mg | 7.5 |
| l-phenylalanine | mg | 8.3 |
| l-threonine | mg | 11.9 |
| l-tryptophane | mg | 2.0 |
| i-Inositol | mg | 1.0 |
| Biotin | mg | 1.0 |
| Folic acid | mg | 1.0 |
| Glucose | mg | 1.0 |
| NaCl | g | 8.0 |
| KCl | g | 0.4 |
| $CaCl_2$ | g | 0.14 |
| l-tyrosine | mg | 18.0 |
| l-valine | mg | 11.7 |
| l-glutamine | mg | 146.0 |
| Glycine | mg | 7.5 |
| Choline | mg | 1.0 |
| Nicotinic acid | mg | 1.0 |
| Ca-pantothenate | mg | 1.0 |
| Pyridoxal | mg | 1.0 |
| Riboflavin | mg | 0.1 |
| Thiamine | mg | 1.0 |
| $MgSO_4 \cdot 7H_2O$ | g | 0.2 |
| $Na_2HPO_4 \cdot 2H_2O$ | g | 0.06 |
| $KH_2PO_4$ | g | 0.06 |
| Phenol red | g | 0.02 |
| Lactalbumin hydrolysate | g | 2.0 |
| Mixture of albumin and alpha globulin | g | 30.0 |

The above quoted substances are dissolved in 500 ml. deionized water and after dissolution the volume is supplemented to 1000 ml.

Remarks regarding preparation:

A. l-cystine and l-tyrosine are preliminarily dissolved in 50 ml. of deionized water containing 10 ml. 0.075 n HCl by heating to 37° C. After dissolution this is mixed with the main solution (prior to supplementing to 1000 ml.!).

B. The solution is sterilized by filtration through a glass filter G5. Prior to use the pH value is adjusted to 7.2 with the aid of a sterile 7.5% natrium bicarbonate solution and penicillin as well as streptomycin are added in an overall final concentration of 100 I.U. of penicillin and 100 gamma streptomycin to 1 ml. of the medium.

What I claim is:

1. A process of growing a tissue culture which comprises inoculating a tissue culture medium including a nutrient solution, and further containing as a growth promoting constituent an active alpha globulin fraction having an electrophoretic mobility of $4.55 \times 10^{-5}$ to $4.75 \times 10^{-5}$ cm.$^2$/v. sec., said medium being substantially free of other active alpha globulins, with tissue cells.

2. A tissue culture medium including a nutrient solution, and further containing as a growth promoting constituent an active alpha globulin fraction having an electrophoretic mobility of $4.55 \times 10^{-5}$ to $4.75 \times 10^{-5}$ cm.$^2$/v. sec., said medium being substantially free of other active alpha globulins.

3. A tissue culture as set forth in claim 2, further containing an amount of methyl cellulose sufficient for adjusting the viscosity of said medium to 14 to 32 centipoises.

4. A tissue culture medium as set forth in claim 2, wherein said globulin fraction is a calf's blood fraction.

5. A tissue culture medium as set forth in claim 2, further containing serum albumin, said medium being substantially free of serum protein fractions other than said specific alpha-globulin and said albumin.

6. A tissue culture medium including a nutrient solution, and further containing as a growth promoting constituent a mixture of serum albumin and of specific alpha globulin having an electrophoretic mobility of $4.55 \times 10^{-5}$ to $4.75 \times 10^{-5}$ cm.$^2$/v. sec., said mixture constituting between 0.05 and 3.0 percent of the weight of said medium, and said medium being substantially free of other active alpha globulins.

7. A tissue culture medium including a nutrient solution, and further containing as a growth promoting constituent a specific alpha globulin having an electrophoretic mobility of $4.55 \times 10^{-5}$ to $4.75 \times 10^{-5}$ cm.$^2$/v. sec., and an amount of methyl cellulose sufficient to make the viscosity of said medium 14 to 32 centipoises, said globulin and said methyl cellulose jointly constituting between 0.05 and 3.0 percent of the weight of said medium, and said medium being substantially free of other active alpha globulins.

References Cited in the file of this patent

UNITED STATES PATENTS

| | | |
|---|---|---|
| 2,761,809 | Kupferberg et al. | Sept. 4, 1956 |
| 2,761,810 | Singher et al. | Sept. 4, 1956 |
| 2,958,628 | Hink | Nov. 1, 1960 |

(Other references on following page)

OTHER REFERENCES

Deutsch J. Biol. Chem., pages 669–678, 1954.

Eagle: Science, September 16, 1955, pages 501–504.

Sanford et al.: J. Nat. Cancer Institute, December 1955, pages 789–801.

Handbook of Biological Data, edited by Spector, page 25, pub. 1956, by W. B. Saunders Co., Phila., Pa.

Liebermann et al.: Science, January 2, 1959, pages 43–44.

Abdel-Samie et al.: "Production of Serum Albumin and of Globulins by Chick Mesenchymal Tissue and by HeLa Tumour Tissue in Culture," Nature (Lond.), 184, Suppl. 6), pp. 361–362, August 1, 1959.

Kent et al.: "Selective Uptake of Serum Globulins and Glycoproteins by Cells Growing in Vitro," Science, 131, pp. 666–668, March 4, 1960. (Copy in POSL.)

Mitamura: "Albumin Fraction in Bovine Serum as an Inducer of Multi-Nucleated Cells in Tissue Culture of Strain L Cells (Mouse Fibroblasts)," Japan J. Expt'l. Med. 29, pp. 585–599, (1959), abstracted in English in Chem. Abstracts 54 (17) #17516G, September 10, 1960.

Phillips et al.: "Some Protective Solutions (Blood Albumin, Gelatin and 15 cps. Methylcellulose) for Tissue-Cultured Cells," Expt'l. Cell Research, 16, pp. 678–682 (1959), per Chem. Abstracts 55 (3) #2777G, February 6, 1961.

Li et al.: "Utilization of Serum Alpha-One Globulin and Glycoprotein by *Diplococcus pneumoniae*," Proc. Soc. Exp. Biol. and Med. 106, pp. 398–400, February 1961.